Dec. 7, 1926.　　　　　　　　　　　　　　　1,609,378
A. MONSEN
VEHICLE BRAKE
Filed March 23, 1925　　2 Sheets-Sheet 2
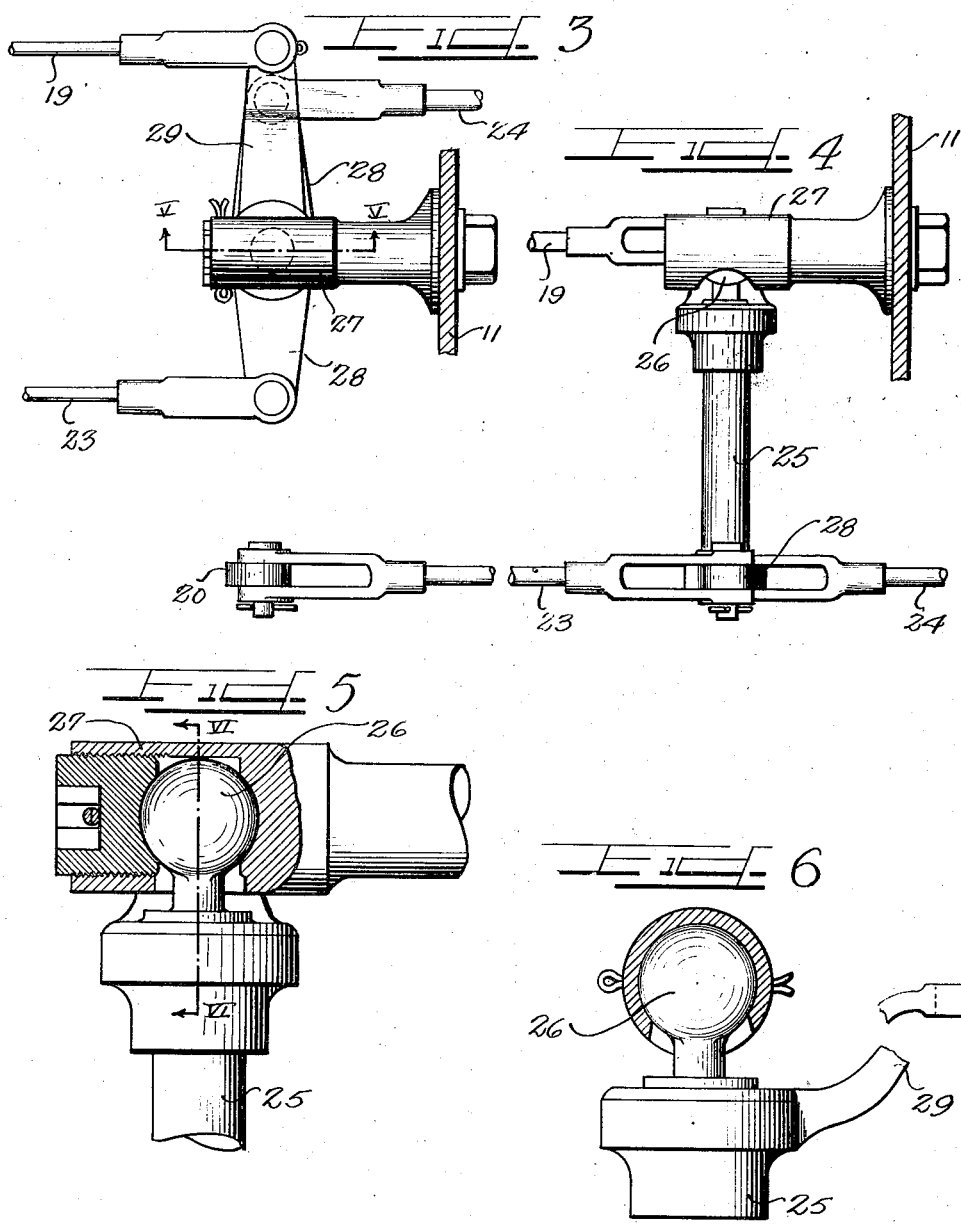

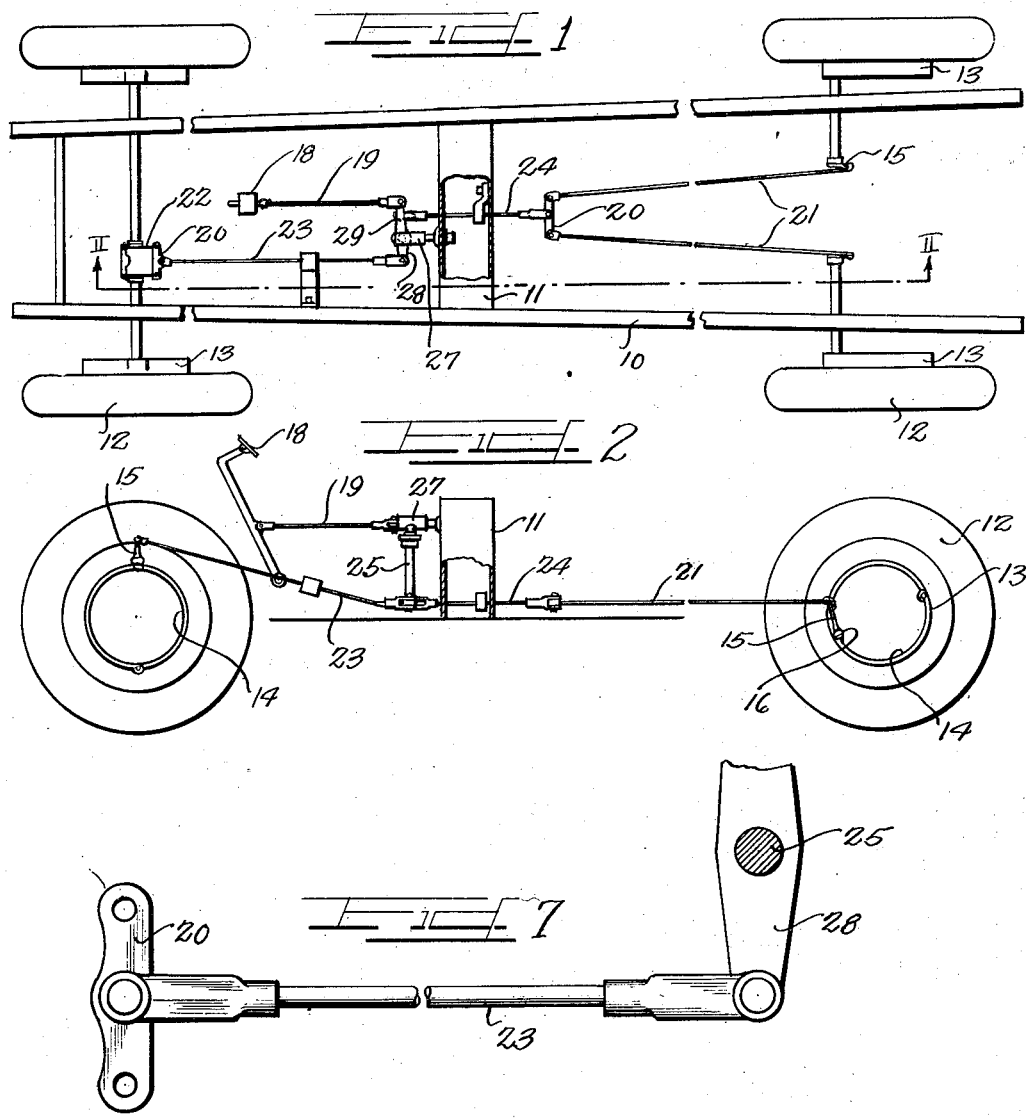

Patented Dec. 7, 1926.

1,609,378

UNITED STATES PATENT OFFICE.

ADOLPH MONSEN, OF LOGANSPORT, INDIANA.

VEHICLE BRAKE.

Application filed March 23, 1925. Serial No. 17,466.

This invention relates to brake operating linkages for automotive vehicles, and particularly to linkages adapted to completely equalize the brake rod pull between individual front and rear wheel brakes.

It is an object of this invention to provide an improved equalizing mechanism to compensate for different adjustments of the brake mechanisms on different wheels by compensating for the unequal travel of the different brake actuating rods required to apply each brake with the same force. With the device hereinafter described, when the brake pedal is pushed to its limit the pull on each individual brake rod will be equalized by a bodily shift or tilting of the brake equalizing mechanism.

It is also an object of this invention to provide an improved brake equalizing device unaffected by weaving or distortion of an automotive vehicle chassis frame in passing over rough roads.

It is a further object of this invention to provide a simplified mechanical equalizing device for four wheel brakes capable of quantity production at reduced cost.

Other and further important objects of this invention will be apparent from the disclosures in the specification and the accompanying drawings.

This invention (in a preferred form) is illustrated in the drawings and hereinafter more fully described.

On the drawings:

Figure 1 is a plan view of an automobile chassis showing the brake linkage applied to the device of this invention.

Figure 2 is a vertical section on the line 2—2 of Figure 1.

Figure 3 is an enlarged top plan view of the equalizing device between the front axle and rear axle brake linkage.

Figure 4 is a side view corresponding to Figure 3.

Figure 5 is an enlarged detail with parts broken away on the line 5—5 of Figure 3.

Figure 6 is a section on the line 6—6 of Figure 5.

Figure 7 is a detail of one of the equalizers between the braking system on one axle.

As shown on the drawings:

In the drawings only enough chassis construction has been included to illustrate the connections and operation of the brake operating mechanism. The chassis frame 10 is shown, together with the customary central cross member 11 serving to stiffen the frame. Front and rear wheels 12 are shown together with brake drums 13 and brakes proper 14, and although the axles have been omitted, as the present invention relates to means for equalizing the pull on the levers 15 which in the particular embodiment chosen serve to rotate cams 16 which expand internal brake shoes 14. It is therefore to be understood that the actual construction of the brakes proper form no part of this invention and the particular form thereof is immaterial as for example, whether internal expanding or external band brakes. The customary brake pedal 18 is indicated, together with the brake pedal rod 19 leading to the equalizer of this invention. The pairs of brakes on each axle are each connected to an equalizing bar or single-tree 20 by means of brake rods 21 and 22. From the equalizer bars 20 similar brake rods 23 and 24 lead to the equalizer of this invention. These brake rods are preferably provided with the usual adjustable forked rod ends and clevis pins.

The equalizer of this invention is connected to each of the brake rods 19, 23 and 24, serving to divide the pull of the rod 19 between the rods 23 and 24 in a constant predetermined ratio. This device comprises an equalizer shaft 25, which in the embodiment chosen for illustration is mounted vertically, having a ball end 26 mounted in a socket 27 bolted to the frame cross member 11 and forming a ball and socket joint giving a universal mounting to the shaft 25 which is capable of rotation as well as oscillation about this pivot mounting. The shaft 25 carries a cross member 28 at the end opposite the ball 26, this cross member being connected at its ends to the fore and aft pairs of braking mechanisms by the brake rods 23 and 24 respectively. The operating brake rod 19 is connected to a lever 29 formed on the shaft 25 near the ball 26. To insure equal division of braking forces fore and aft the point of attachment of the rod 19 must lie in a plane passing through the ball center and perpendicular to the axis of the shaft. In the illustrations this has been accomplished by bending the lever 29 into the proper shape.

Under some conditions it is desirable to increase the proportional braking force on the rear wheels to insure that these wheels will lock before the front wheels to maintain steerability for the vehicle. To accomplish such a result the lever 29 is not bent as far as in the cited example thereby bringing the point of attachment of the rod 19 somewhat below the center of the ball 25. When the brake rod 19 exerts its pull in a plane passing through the ball it will have no tilting effect on the shaft 25 and the force will therefore be translated into a rotation of the shaft, whereas if the rod 19 pulls from a point below the defined plane it will have a tilting and rotating effect on the shaft, the tilting effect increasing the force transmitted toward the rear wheel brakes and thus producing a predetermined ratio of braking effect between the front and rear axle systems.

In operation the equalizing shaft 25 is subject to bending as well as twisting forces, even when arranged for true equalization of the forces applied to the brakes, for the reason that the brake rods may have unequal distances to travel to develop the same pull on the rods. For example the individual adjustments of the different brakes will almost certainly vary. Even though one of the rods connected to the shaft 25 has a greater distance to travel than the other, when the brake pedal and rod is pushed to the limit the pull on each bar will be practically equalized by a shift or tilting of the shaft 25. The rod ends, yokes and clevis pins have sufficient play at the pins to permit of reasonable distortion from the designed layout. A further reason for the universal mounting for the shaft is because of weaving of the frame itself as well as spring distortions which might otherwise affect the application of the brakes.

I am aware that many changes may be made, and numerous details of construction may be varied through a wide range without departing from the principles of this invention, and I therefore do not purpose limiting the patent granted hereon, otherwise than necessitated by the prior art.

I claim:

1. In combination with four wheel brakes for vehicles, yokes equalizing the front and rear pairs of brakes, a torsion member connected at one end to said yokes to tension the same, a pivoted support for the other end of said torsion member and brake operating mechanism adapted to turn said torsion member.

2. In a brake operating system for vehicles having front and rear wheel brakes, a shaft pivotally mounted at one end, operating mechanism adapted to partially rotate said shaft, a cross member formed on the other end of said shaft and connections from the ends of said cross member to the front and rear wheel brakes whereby rotation of said shaft is adapted to equalize the forces transmitted to said brakes.

3. In a brake operating mechanism of the class described, an equalizing mechanism mounted between front and rear brake operating rods pulling in opposite directions, comprising a shaft having a ball and socket support at one end, a cross member at the other end of said shaft having the brake operating rods secured to the ends thereof, and brake operating mechanism adapted to turn said shaft.

4. In a brake operating mechanism of the class described, an equalizing mechanism mounted between front and rear brake operating rods pulling in opposite directions, comprising a shaft having a ball and socket support at one end, a cross member at the other end of said shaft having the brake operating rods secured to the ends thereof, a lever terminating in a plane at right angles to the axis of the shaft and passing through the center of the ball and socket joint, and actuating mechanism secured to said lever.

In testimony whereof I have hereunto subscribed my name.

ADOLPH MONSEN.